US012513669B2

(12) United States Patent
Miao et al.

(10) Patent No.: US 12,513,669 B2
(45) Date of Patent: Dec. 30, 2025

(54) METHODS, DEVICES AND COMPUTER READABLE MEDIA FOR COMMUNICATIONS ON A SIDELINK

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 451 days.

(21) Appl. No.: 17/909,230

(22) PCT Filed: Mar. 4, 2020

(86) PCT No.: PCT/CN2020/077857
§ 371 (c)(1),
(2) Date: Sep. 2, 2022

(87) PCT Pub. No.: WO2021/174468
PCT Pub. Date: Sep. 10, 2021

(65) Prior Publication Data
US 2023/0091084 A1    Mar. 23, 2023

(51) Int. Cl.
*H04W 72/0446* (2023.01)
*H04L 5/16* (2006.01)
*H04W 72/02* (2009.01)
*H04W 72/40* (2023.01)

(52) U.S. Cl.
CPC ........... *H04W 72/0446* (2013.01); *H04L 5/16* (2013.01); *H04W 72/02* (2013.01); *H04W 72/40* (2023.01)

(58) Field of Classification Search
CPC . H04W 72/0446; H04W 72/02; H04W 72/40; H04L 5/16
See application file for complete search history.

(56) References Cited

U.S. PATENT DOCUMENTS

| 2022/0095279 | A1* | 3/2022 | Hwang | ............... H04L 27/2602 |
| 2022/0109546 | A1* | 4/2022 | Panteleev | ............. H04L 5/0053 |
| 2022/0303985 | A1* | 9/2022 | Miao | .................. H04W 72/0446 |
| 2022/0322359 | A1* | 10/2022 | Ye | ..................... H04W 72/0446 |

(Continued)

FOREIGN PATENT DOCUMENTS

| CN | 110536429 A | 12/2019 |
| EP | 4 018 580 A1 | 6/2022 |

(Continued)

OTHER PUBLICATIONS

"Discussion on resource allocation for mode 2", Spreadtrum Communications, 3GPP TSG RAN WG1 Meeting #95, R1-1813085, Nov. 12-16, 2018, 7 pages, Spokane, USA.

(Continued)

*Primary Examiner* — Deepa Belur
(74) *Attorney, Agent, or Firm* — Sughrue Mion, PLLC (57) ABSTRACT

Embodiments of the present disclosure relate to methods, devices and computer readable media for communications. A method comprises determining, at a first terminal device, whether to obtain information about candidate resources for a sidelink transmission. The method further comprises in response to a determination that the information is to be obtained, receiving the information from a second terminal (Continued)

device. The method further comprises determining target resources for performing the sidelink transmission based on the information.

4 Claims, 4 Drawing Sheets

(56) References Cited

U.S. PATENT DOCUMENTS

2022/0346118 A1* 10/2022 Wu .................. H04L 1/1825
2022/0361232 A1* 11/2022 Zhao ................ H04W 72/20

FOREIGN PATENT DOCUMENTS

WO         2019/064465 A1      4/2019
WO    WO-2020173536 A1  *  9/2020

OTHER PUBLICATIONS

"Discussion on sidelink resource allocation and pool configuration for IoT and wearables", LG Electronics, 3GPP TSG RAN WG1 Meeting #89, R1-1707584, May 15-19, 2017, 3 pages, Hangzhou, P.R. China.

"Discussion on sidelink resource allocation and configuration for FeD2D", 3GPP TSG RAN WG1 Meeting #90, R1-1713116, Aug. 21-25, 2017, pp. 1-3, Prague, Czech Republic.

International Search Report for PCT/CN2020/077857, Nov. 27, 2020.

Written Opinion for PCT/CN2020/077857, Nov. 27, 2020.

Extended European Search Report dated Mar. 3, 2023 in European Application No. 20923286.7.

Qualcomm Inc., "Sidelink Resource Allocation Mechanism for NR V2X", 3GPP TSG RAN WG1 Meeting #100-e, Feb. 24-Mar. 6, 2020, R1-2000963 (11 pages total).

InterDigital Inc., "Physical Layer Procedures for NR V2X Sidelink", 3GPP TSG RAN WG1 Ad-Hoc Meeting 1901, Jan. 21-25, 2019, R1-1900794, Taipei, Taiwan (10 pages total).

Notice of Reasons for Refusal issued Oct. 17, 2023 in Japanese Application No. 2022-552987.

"Design of Resource Allocation Mode-2 for NR V2X Sidelink Communication," Intel Corporation, 3GPP TSG RAN WG1 Meeting #99, Nov. 18-22, 2019, pp. 1-32 (32 pages total), R1-1912205.

Communication dated Apr. 22, 2025 from the Japanese Patent Office in Application No. 2024-021863.

NEC, "Remaining issues on resource allocation Mode 2", 3GPP TSG RAN WG1 #101, e-Meeting, May 25-Jun. 5, 2010, R1-2004310, 6 pages total.

* cited by examiner

METHODS, DEVICES AND COMPUTER READABLE MEDIA FOR COMMUNICATIONS ON A SIDELINK

CROSS REFERENCE TO RELATED APPLICATIONS

This application is a National stage of International Application No. PCT/CN2020/077857 filed Mar. 4, 2020.

TECHNICAL FIELD

Embodiments of the present disclosure generally relate to the field of telecommunication, and in particular, to methods, devices and computer readable media for communications.

BACKGROUND

Certain communication systems enable vehicle to everything (V2X) and device to device (D2D) communications to be performed. V2X communications can be based on communication technologies such as sidelink communication technologies. For this, sidelink resource pools and sidelink channels can be established for vehicles participating in such communications.

In V2X communications, there are two modes of resource allocation. In a first mode (also referred to as NR V2X mode 1 or mode 1 hereinafter), one terminal device may perform V2X communications with the other terminal device by using resources allocated by a network device. In a second mode (also referred to as NR V2X mode 2 or mode 2 hereinafter), one terminal device may perform V2X communications with the other terminal device by using resources autonomously selected in a resource pool by the one terminal device. In order to enhance reliability and reduce latency, feasibility and benefit of the enhancements in the mode 2 need to be studied.

SUMMARY

In general, example embodiments of the present disclosure provide methods, devices and computer readable media for communications.

In a first aspect, there is provided a method for communications. The method comprises determining, at a first terminal device, whether to obtain information about candidate resources for a sidelink transmission. The method further comprises in response to a determination that the information is to be obtained, receiving the information from a second terminal device. The method further comprises determining target resources for performing the sidelink transmission based on the information.

In a second aspect, there is provided a method for communications. The method comprises: determining, at a second terminal device, candidate resources for a first terminal device to perform a sidelink transmission. The method further comprises determining whether to provide information about the candidate resources. The method further comprises in response to a determination that the information is to be provided, transmitting the information to the first terminal device.

In a third aspect, there is provided a first terminal device. The first terminal device comprises a processor and a memory storing instructions. The memory and the instructions are configured, with the processor, to cause the first terminal device to perform the method according to the first aspect.

In a fourth aspect, there is provided a second terminal device. The second terminal device comprises a processor and a memory storing instructions. The memory and the instructions are configured, with the processor, to cause the second terminal device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, in V2X communications, in the mode 2 of resource allocation, one terminal device may perform V2X communications with the other terminal device by using resources autonomously selected in a resource pool by the one terminal device. In order to enhance reliability and reduce latency, feasibility and benefit of the enhancements in the mode 2 need to be studied.

Embodiments of the present disclosure provide a solution for resource allocation in V2X communications, so as to solve the above problems and one or more of other potential problems. According to the solution, a first terminal device determines whether to obtain information about candidate resources for a sidelink transmission. If it is determined that the information is to be obtained, the first terminal device receives the information from a second terminal device. In turn, the first terminal device determines target resources for performing the sidelink transmission based on the information. As such, coordination for resource allocation between two terminal devices is enabled.

Figure 1:
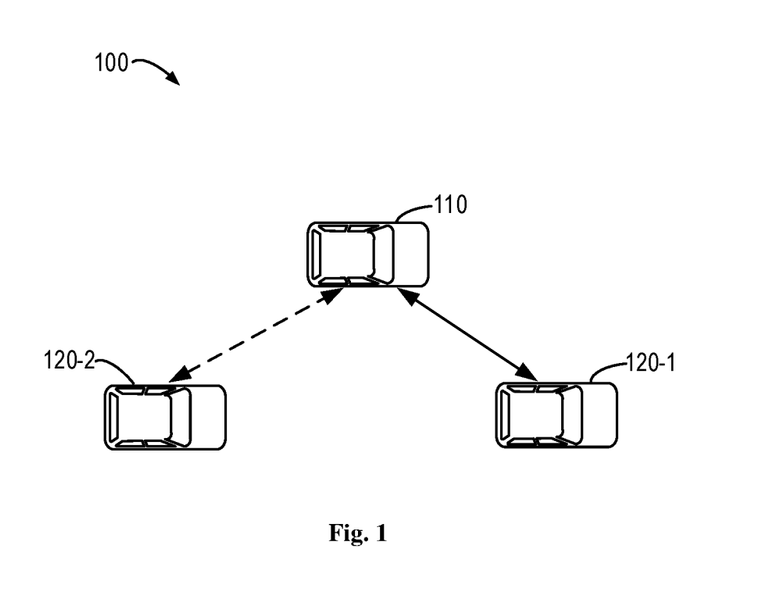
FIG. 1 illustrates an example communication network in which implementations of the present disclosure can be implemented.

FIG. 1 illustrates a schematic diagram of an example communication network 100 in which embodiments of the present disclosure can be implemented. As shown in FIG. 1, the communication network 100 may include a terminal device 110 (also referred to as "first terminal device 110"), and terminal devices 120-1 and 120-2 (collectively referred to as "second terminal devices 120" or individually referred to as "second terminal device 120"). It should be understood that the communication network 100 may further include a network device (not shown). The network device may communicate with the first terminal device 110 and the second terminal devices 120 via respective wireless communication channels. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

In FIG. 1, the first terminal device 110 and the second terminal devices 120 are shown as vehicles which enable V2X communications. It is to be understood that embodiments of the present disclosure are also applicable to other terminal devices than vehicles, such as mobile phones, sensors and so on.

In some embodiments, the first terminal device 110 may have established a sidelink with the terminal device 120-1. In other words, the first terminal device 110 may have established an on-going communication session with the terminal device 120-1. In this regard, the terminal device 120-1 may be referred to as an in-session terminal device.

In some other embodiments, the first terminal device 110 may not have established a sidelink with the terminal device 120-1. In other words, the first terminal device 110 may not have established an on-going communication session with the terminal device 120-1. In this regard, the terminal device 120-1 may be referred to as an out-of-session terminal device.

In some other embodiments, the first terminal device 110 may communicate with the second terminal device 120-1 in a unicast manner. In still other embodiments, the first terminal device 110 may communicate with a group of terminal devices in a groupcast manner. The group of terminal devices may or may not include the terminal device 120-1 and the terminal device 120-2.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
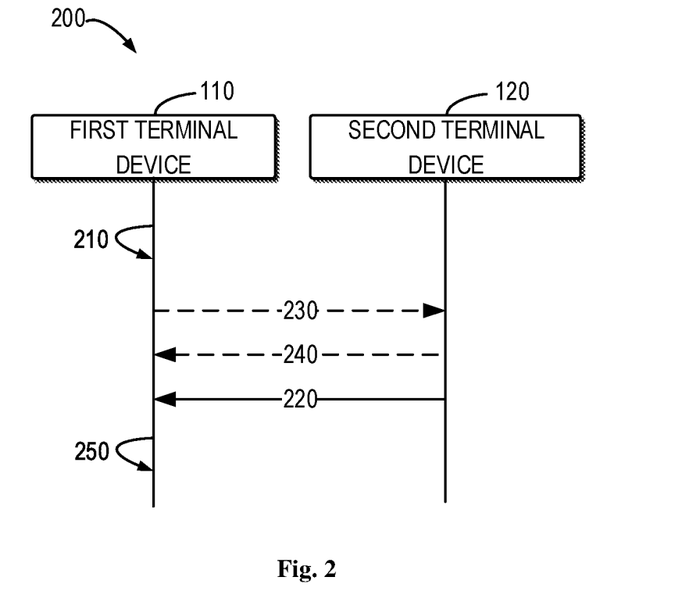
FIG. 2 illustrates an example signaling chart showing an example process for resource allocation in accordance with some embodiments of the present disclosure.

FIG. 2 illustrates an example signaling chart showing an example process 200 for resource allocation in accordance with some embodiments of the present disclosure. As shown in FIG. 2, the process 200 may involve the first terminal device 110 and the second terminal devices 120 as shown in FIG. 1. It is to be understood that the process 200 may include additional acts not shown and/or may omit some acts as shown, and the scope of the present disclosure is not limited in this regard. In addition, it will be appreciated that, although primarily presented herein as being performed serially, at least a portion of the acts of the process 200 may be performed contemporaneously or in a different order than as presented in FIG. 2.

As shown in FIG. 2, the first terminal device 110 determines 210 whether to obtain information about candidate resources for a sidelink transmission.

In some embodiments, if it is determined that a predefined condition is met, the first terminal device 110 determines to obtain the information about candidate resources.

As mentioned above, in some embodiments, the first terminal device 110 may communicate with the terminal device 120-1 in a unicast manner. In other words, the first terminal device 110 may transmit at least one packet only to the terminal device 120-1. In such embodiments, the first terminal device 110 may determine a first number of contiguous failed packets or transport blocks. If the first number of contiguous failed packets or transport blocks exceeds a first configured threshold, the first terminal device 110 may determine that the predefined condition is met.

In some embodiments, the first terminal device 110 may determine the first number of negative acknowledgements (NACKs) and discontinuous transmissions (DTXs) from the second terminal device 120 as the first number of contiguous failed packets or transport blocks.

In embodiments where the first terminal device 110 communicates with the terminal device 120-1 in the unicast manner, the first terminal device 110 may determine, for a single Hybrid Automatic Repeat Request (HARQ) process identifier (ID), a second number of NACKs contiguously received by the first terminal device 110. If the second number of NACKs exceeds a second configured threshold, the first terminal device 110 may determine that the predefined condition is met.

In embodiments where the first terminal device 110 communicates with the terminal device 120-1 in the unicast manner, the first terminal device 110 may determine, within a first time window, a third number of failed packets or failed transport blocks. If a ratio of the third number to a fourth number of packets or transport blocks transmitted from the first terminal device 110 to the second terminal device 120 exceeds a third configured threshold, the first terminal device 110 may determine that the predefined condition is met.

In some embodiments, the first terminal device 110 may determine the third number of NACKs and DTXs from the second terminal device 120-1 as the third number of failed packets or failed transport blocks.

Alternatively, in embodiments where the first terminal device 110 communicates with the terminal device 120-1 in the unicast manner, the first terminal device 110 may determine, within a second time window, a fifth number of NACKs received by the first terminal device 110 for a single HARQ process ID. If a second ratio of the fifth number to a sum of the NACKs and positive acknowledgements (ACKs) received by the first terminal device 110 for the single HARQ process ID exceeds a fourth configured threshold, the first terminal device 110 may determine that the predefined condition is met.

In some embodiments, the first terminal device 110 may determine the third number of NACKs and DTXs from the second terminal device 120 as the third number of failed packets or failed transport blocks.

As mentioned above, in some embodiments, the first terminal device 110 may communicate with a group of terminal devices in a groupcast manner. The group of terminal devices may include the terminal device 120-1 and the terminal device 120-2 and other devices not shown in FIG. 1. In other words, the first terminal device 110 may transmit at least one packet to the group of the terminal devices. In such embodiments, the first terminal device 110 may detect power of a sixth number of NACKs for the at least one packet transmitted to the group from associated PSFCH resources. If the detected power exceeds a fourth configured threshold, the first terminal device 110 may determine that the predefined condition is met. In some embodiments, the detected power is normalized to the size of the group. Size of the group here and hereinafter may refer to the number of member UE or receiver devices in the group or group size from higher layer.

Alternatively, in embodiments where the first terminal device 110 communicates with the group of terminal devices in the groupcast manner, the first terminal device 110 may determine a third ratio of the sixth number of NACKs to a size of the group. If the third ratio exceeds a fifth configured threshold, the first terminal device 110 may determine that the predefined condition is met.

In some embodiments, for packets or signals to be transmitted by the first terminal device, if a priority in sidelink control information (SCI) exceeds a sixth configured threshold, the first terminal device 110 may determine that the predefined condition is met.

Alternatively, for the packets or signals to be transmitted by the first terminal device, if a Quality of Service (QoS) parameter from higher layer or in SCI exceeds the sixth configured threshold, the first terminal device 110 may determine that the predefined condition is met.

Alternatively, for the packets or signals to be transmitted by the first terminal device, if 5G Quality Indication (5QI) from higher layer exceeds the sixth configured threshold, the first terminal device 110 may determine that the predefined condition is met.

In some embodiments, the first terminal device 110 may measure sidelink channel busy ratio (SL CBR) or sidelink channel occupancy ratio (SL CR). If the measured SL CBR or SL CR exceeds a configured thresholds, the first terminal device 110 may determine that the predefined condition is met.

In some embodiments, if the first terminal device 110 receives a first request from the second terminal device 120, the first terminal device 110 may determine to obtain the information about the candidate resources. The first request indicates that the second terminal device 120 is to transmit the information to the first terminal device 110.

In some embodiments, the first terminal device 110 may receive the first request from the second terminal device 120 via a radio resource control signaling. Alternatively, the first terminal device 110 may receive the first request via sidelink control information. Alternatively, the first terminal device 110 may receive the first request via Physical Sidelink Feedback Channel (PSFCH) between the first terminal device 110 and the second terminal device 120.

In some embodiments, if the first terminal device 110 receives from a network device a signaling indicating that the second terminal device 120 is to transmit the information to the first terminal device 110, the first terminal device 110 may determine to obtain the information.

In some embodiments, the first terminal device 110 may receive the signaling from the network device via a radio resource control signaling. Alternatively, the first terminal device 110 may receive the signaling from the network device via downlink control information.

With continued reference to FIG. 2, if it is determined that the information about the candidate resources is to be obtained, the first terminal device 110 receives 220 the information from the second terminal device 120

In some embodiments, the first terminal device 110 may receive the information via one of the following: Physical Sidelink Control Channel (PSCCH), PSFCH or RRC signaling.

In some embodiments, optionally, if it is determined that the information about the candidate resources is to be obtained, the first terminal device 110 may transmit 230 a second request for resource allocation to the second terminal device 120.

In some embodiments, the first terminal device 110 may transmit the second request via SCI. For example, the first terminal device 110 may transmit the second request via a first stage SCI carried on PSCCH. In this way, more than one terminal device may receive the second request. For example, both the terminal device 120-1 and the terminal device 120-2 may receive the second request.

Alternatively, the first terminal device 110 may transmit the second request via a second stage SCI carried on PSSCH. In this way, only intended receiver(s) may receive the second request. For example, in case where the first terminal device 110 has established the sidelink with the terminal device 120-1, only the terminal device 120-1 may receive the second request.

In some embodiments, the first terminal device 110 may transmit the second request via a medium access control control element (MAC CE), or an RRC signaling. In this way, only intended receiver(s) may receive the second request.

In some embodiments, optionally, the second terminal device 120 may transmit 240 to the first terminal device 110 a first response to the second request for resource allocation. The first response indicates that the second terminal device 120 accepts the second request. In such embodiments, the second terminal device 120 may transmit to the first terminal device 110 an indication indicating a location of the information instead of the information itself. The indication may indicate the location of the information in a MAC CE on a PSSCH.

In some embodiments, the second terminal device 120 may transmit the information of candidate resources without any response to the second request. For example, the second terminal device 120 may transmit the information of the candidate resources via the PSFCH between the second terminal device 120 and the first terminal device 110. In this case, the first terminal devices 110 will always attempt to decode the information about the candidate resources from the associated PSFCH.

In some embodiments, the second terminal device 120 may transmit the first response and the indication in parallel. For example, the second terminal device 120 may transmit the first response together with the indication via the PSFCH between the second terminal device 120 and the first terminal device 110. Alternatively, the second terminal device 120 may transmit the first response and the indication in series.

Compared with transmitting both the first response and the information itself via the PSFCH, it may reduce overhead on the PSFCH to transmit the first response and the indication.

In other embodiments, optionally, the second terminal device 120 may transmit a second response to the second request for resource allocation to the first terminal device 110. The second response indicates that the second terminal device 120 rejects the second request. Upon receiving the second response, the first terminal device will not attempt to decode the information about the candidate resources.

In some embodiments, the second terminal device 120 may transmit the second response via the PSFCH between the second terminal device 120 and the first terminal device 110.

With continued reference to FIG. 2, the first terminal device 110 determines 250 target resources for performing the sidelink transmission based on the information about the candidate resources.

In some embodiments, the information about the candidate resources comprises information about a first set of slots that will not be used by the second terminal device 120. For example, the resources comprise the first set of slots that will not be used for transmission by the in-session terminal device 120-1. In such embodiments, in order to help avoid half-duplex at the in-session terminal device 120-1, the first terminal device 110 may select at least part of the first set of slots for the sidelink transmission at the first terminal device 110.

In some other embodiments, the information about the candidate resources comprises information about a second set of slots that will be used by the second terminal device 120. For example, the resources comprise the second set of slots that will be used for transmission by the in-session terminal device 120-1. In such embodiments, in order to help avoid half-duplex at the in-session terminal device 120-1, the first terminal device 110 may determine the target resources from a resource pool by excluding the second set of slots from the resource pool.

In still other embodiments, the candidate resources comprise one or more sets of resources which are results of sensing for sidelink channels by the one or more second terminal device 120. For example, the candidate resources comprise one or more sets of resources which are results of sensing for sidelink channels by at least the out-of-session terminal device 120-2 and other devices not shown in FIG. 1. Upon receiving the information about the results of sensing, the first terminal device 110 may determine the target resources. For example, the target resources are determined as at least one of the results of sensing or the combined results. Thus, the first terminal device 110 does not need sense the sidelink channels for resource selection.

In still other embodiments, the candidate resources comprise a set of resources configured by a network device.

Figure 3:
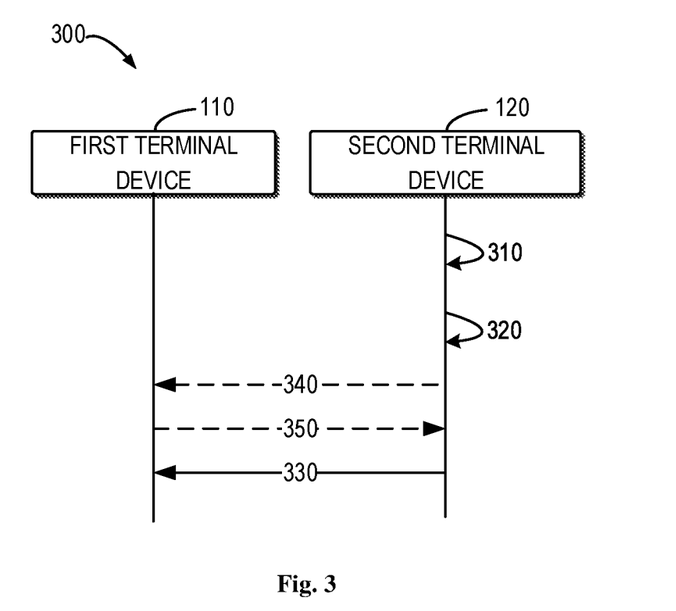
FIG. 3 illustrates an example signaling chart showing an example process for resource allocation in accordance with other embodiments of the present disclosure.

FIG. 3 illustrates an example signaling chart showing an example process 300 for resource allocation in accordance with some embodiments of the present disclosure. As shown in FIG. 3, the process 300 may involve the first terminal device 110 and the second terminal devices 120 as shown in FIG. 1. It is to be understood that the process 300 may include additional acts not shown and/or may omit some acts as shown, and the scope of the present disclosure is not limited in this regard. In addition, it will be appreciated that, although primarily presented herein as being performed serially, at least a portion of the acts of the process 300 may be performed contemporaneously or in a different order than as presented in FIG. 3.

As shown in FIG. 3, the second terminal device 120 determines 310 candidate resources for the first terminal device 110 to perform a sidelink transmission.

In some embodiments, the candidate resources comprise a first set of slots that will not be used by the second terminal device 120. For example, the candidate resources comprise the first set of slots that will not be used by the in-session terminal device 120-1. In such embodiments, in order to help avoid half-duplex at the in-session terminal device 120-1, the first terminal device 110 may select at least part of the first set of slots for the sidelink transmission at the first terminal device 110.

In some other embodiments, the candidate resources comprise a second set of slots that will be used by the second terminal device 120. For example, the candidate resources comprise the second set of slots that will be used by the in-session terminal device 120-1. In such embodiments, in order to help avoid half-duplex at the in-session terminal device 120-1, the first terminal device 110 may determine the target resources from a resource pool by excluding the second set of slots from the resource pool.

In still other embodiments, the candidate resources comprise one or more sets of resources which are results of sensing for sidelink channels at least by the second terminal device 120.

Upon determining the candidate resources for the first terminal device 110 to perform a sidelink transmission, the second terminal device 120 determines 320 whether to provide information about the candidate resources.

In some embodiments, if the second terminal device 120 receives the second request from the first terminal device 120, the second terminal device 120 may determine to provide the information. The second request indicates that the first terminal device 110 is to receive the information from the second terminal device 120.

In some embodiments, upon receiving the second request, the second terminal device 120 may further determine whether capability of the second terminal device 120 enables the second terminal device 120 to provide the information. If the capability of the second terminal device 120 enables the second terminal device 120 to provide the information, the second terminal device 120 may determine to provide the information.

In other embodiments, upon receiving the second request, the second terminal device 120 may further determine a distance between the second terminal device 120 and the first terminal device 110. If the distance is below a configured threshold, the second terminal device 120 may determine to provide the information. In some embodiments, the distance may comprise one of a physical distance and a radio distance.

As described with reference to FIG. 2, the first terminal device 110 may transmit the second request via SCI, MAC CE or RRC signaling. Accordingly, the second terminal device 120 may receive the second request via SCI, MAC CE or RRC signaling.

As described with reference to FIG. 2, the first terminal device 110 may transmit the second request via the first stage SCI carried on PSCCH or the second stage SCI carried on PSSCH. Accordingly, the second terminal device 120 may receive the second request via the first stage SCI carried on PSCCH or the second stage SCI carried on PSSCH.

In some embodiments, upon receiving the second request, the second terminal device 120 may transmit a first response to the second request to the first terminal device 110. The first response indicates that the second terminal device 120 accepts the second request. In some embodiments, the second terminal device 120 may transmit the first response via the PSFCH between the second terminal device 120 and the first terminal device 110.

In some embodiments, the second terminal device 120 may transmit to the first terminal device 110 an indication indicates a location of the information. In some embodiments, the indication indicates the location of the information in an MAC CE on PSSCH.

In some embodiments, the second terminal device 120 may transmit to the first terminal device 110 the information directly. In some embodiments, the second terminal device 120 may transmit the information via the PSFCH between the second terminal device 120 and the first terminal device 110.

In other embodiments, upon receiving the second request, the second terminal device 120 may transmit a second response to the second request to the first terminal device 110. The second response indicates that the second terminal device 120 rejects the second request. In some embodiments, the second terminal device 120 may transmit the second response via the PSFCH between the second terminal device 120 and the first terminal device 110.

In some embodiments, in order to determine whether to provide the information about the candidate resources, the second terminal device 120 may detect time elapsed between two successive successful receptions of two different packets transmitted from the first terminal device 110 to the second terminal device 120 for a single application. If the time exceeds a configured threshold, the second terminal device 120 may determine to provide the information.

In other embodiments, if the second terminal device 120 receives from a network device a signaling indicates that the first terminal device 110 is to receive the information from the second terminal device 120, the second terminal device 120 may determine to provide the information.

With continued reference to FIG. 3, the second terminal device 120 transmits 330 the information to the first terminal device 110.

In some embodiments, the second terminal device 120 may transmit the information via the PSFCH between the second terminal device 120 and the first terminal device 110.

In some other embodiments, the second terminal device 120 may transmit the information via PSSCH.

In still other embodiments, the second terminal device 120 may transmit the information via an RRC signaling.

In some embodiments, optionally, before transmitting the information to the first terminal device 110, the second terminal device 120 may transmit 340 a first request to the first terminal device 110. The first request indicates that the second terminal device 120 is to transmit the information to the first terminal device 110.

In some embodiments, upon receiving the first request, the first terminal device 110 may transmit 350 a response to the first request. The response indicates that the first terminal device 110 accepts the first request.

Figure 4:
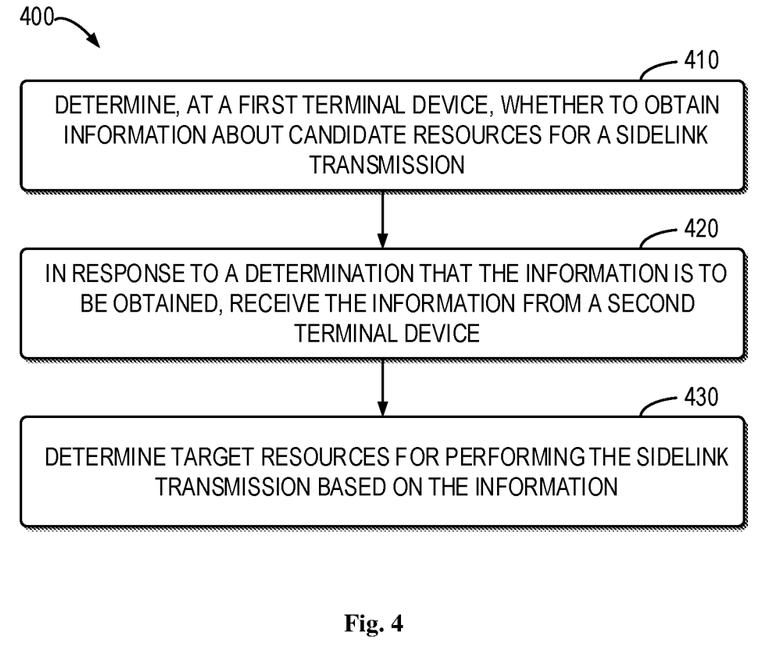
FIG. 4 illustrates a flowchart of an example method in accordance with some embodiments of the present disclosure.

FIG. 4 illustrates a flowchart of an example method 400 in accordance with some embodiments of the present disclosure. For example, the method 400 can be performed at the first terminal device 110 as shown in FIGS. 1-2. It is to be understood that the method 400 may include additional blocks not shown and/or may omit some blocks as shown, and the scope of the present disclosure is not limited in this regard.

At block 410, the first terminal device 110 determines whether to obtain information about candidate resources for a sidelink transmission.

At block 420, in response to a determination that the information is to be obtained, the first terminal device 110 receives the information from a second terminal device 120.

At block 430, the first terminal device 110 determines target resources for performing the sidelink transmission based on the information.

In some embodiments, determining whether to obtain the information about the candidate resources comprises: in response to a determination that a predefined condition is met, determining to obtain the information.

In some embodiments, the method 400 further comprises: in accordance with a determination that, for at least one packet transmitted from the first terminal device to the second terminal device, a first number of contiguous failed packets or transport blocks exceeds a first configured threshold, determining that the predefined condition is met.

In some embodiments, the first number of contiguous failed packets or transport blocks are determined based on the first number of negative acknowledgements and discontinuous transmissions from the second terminal device.

In some embodiments, the method 400 further comprises: in accordance with a determination that, for a single Hybrid Automatic Repeat Request process identifier, a second number of negative acknowledgements contiguously received by the first terminal device exceeds a second configured threshold, determining that the predefined condition is met.

In some embodiments, the method 400 further comprises: in accordance with a determination that, within a first time window, a first ratio of a third number of failed packets or failed transport blocks to a fourth number of packets or transport blocks transmitted from the first terminal device to the second terminal device exceeds a third configured threshold, determining that the predefined condition is met, or in accordance with a determination that, within a second time window, a second ratio of a fifth number of negative acknowledgements received by the first terminal device to a sum of the negative acknowledgements and positive acknowledgements received by the first terminal device exceeds a fourth configured threshold, determining that the predefined condition is met.

In some embodiments, the third number of failed packets or failed transport blocks are determined based on the third number of negative acknowledgements and discontinuous transmissions from the second terminal device.

In some embodiments, the method 400 further comprises: for at least one packet transmitted from the first terminal device 110 to a group of terminal devices, in accordance with a determination that, a detected power of a sixth number of negative acknowledgements exceeds a fourth configured threshold, determining that the predefined condition is met, or in accordance with a determination that, a third ratio of the sixth number of negative acknowledgements to a size of the group exceeds a fifth configured threshold, determining that the predefined condition is met.

In some embodiments, the detected power is normalized to the size of the group.

In some embodiments, the method 400 further comprises: in accordance with a determination that, for packets or signals to be transmitted by the first terminal device 110, one of the following exceeds a sixth configured threshold, determining that the predefined condition is met: a priority in SCI, QoS parameter, or 5QI.

In some embodiments, determining whether to obtain the information about the candidate resources comprises: in response to receiving a first request from the second terminal device 120, determining to obtain the information, the first request indicating that the second terminal device 120 is to transmit the information to the first terminal device 110.

In some embodiments, determining whether to obtain the information about the candidate resources comprises: in response to receiving from a network device a signaling indicating that the second terminal device 120 is to transmit the information to the first terminal device 110, determining to obtain the information.

In some embodiments, the method 400 further comprises: in response to a determination that the information is to be obtained, transmitting a second request for resource allocation to the second terminal device 120.

In some embodiments, transmitting the second request comprises transmitting the second request via one of the following: SCI, a MAC CE, or an RRC signaling.

In some embodiments, transmitting the second request via the SCI comprises transmitting the second request via one of the following: a first stage SCI carried on a PSCCH, or a second stage SCI carried on a PSSCH.

In some embodiments, the method 400 further comprises: receiving a first response to the second request from the second terminal device 120, the first response indicating that the second terminal device 120 accepts the second request.

In some embodiments, receiving the first response comprises: receiving the first response via a PSFCH.

In some embodiments, the method 400 further comprises: receiving a second response to the second request from the second terminal device 120, the second response indicating that the second terminal device 120 rejects the second request.

In some embodiments, receiving the second response comprises: receiving the second response via a PSFCH.

In some embodiments, receiving the information comprises: receiving from the second terminal device 120 an indication indicating a location of the information.

In some embodiments, the indication indicates the location of the information in a MAC CE on a PSSCH.

In some embodiments, the information about the candidate resources comprises information about a first set of slots that will not be used by the second terminal device 120; and determining the target resources based on the information comprises: selecting at least part of the first set of slots.

In some embodiments, the information about the candidate resources comprises information about a second set of slots that will be used by the second terminal device 120; and determining the target resources based on the information comprises: determining the target resources from a resource pool by excluding the second set of slots from the resource pool.

In some embodiments, the candidate resources comprise one or more sets of resources which are results of sensing for sidelink channels at least by the second terminal device 120.

In some embodiments, receiving the information comprises receiving the information via one of the following: a PSFCH, a PSSCH, or an RRC signaling.

In some embodiments, the method 400 further comprises: in accordance with a determination that measured sidelink channel busy ratio (SL CBR) or measured sidelink channel occupancy ratio (SL CR) exceeds a configured thresholds, determining that the predefined condition is met.

In some embodiments, the candidate resources comprise a set of resources configured by a network device.

Figure 5:
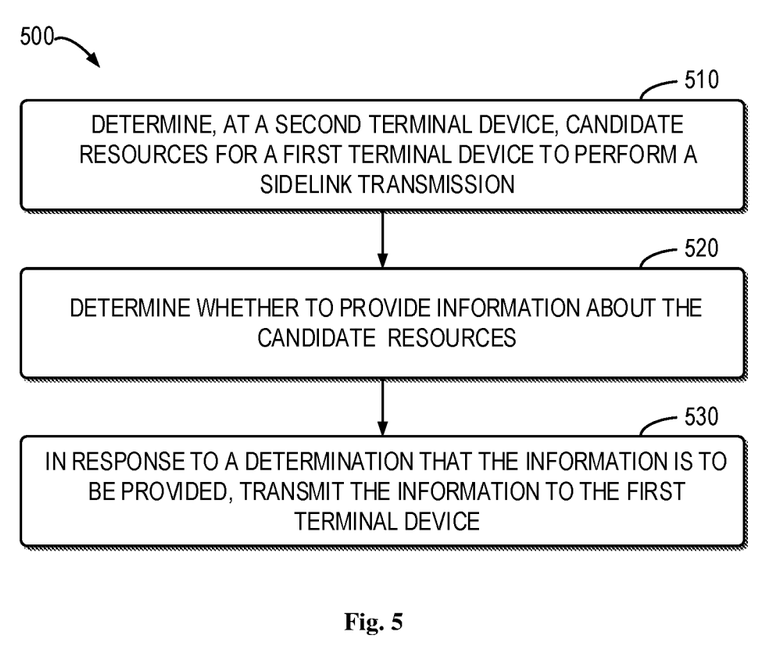
FIG. 5 illustrates a flowchart of an example method in accordance with some embodiments of the present disclosure.

FIG. 5 illustrates a flowchart of an example method 500 in accordance with some embodiments of the present disclosure. For example, the method 500 can be performed at the second terminal device 120 as shown in FIGS. 1 and 3. It is to be understood that the method 500 may include additional blocks not shown and/or may omit some blocks as shown, and the scope of the present disclosure is not limited in this regard.

At block 510, the second terminal device 120 determines candidate resources for the first terminal device 110 to perform a sidelink transmission.

At block 520, the second terminal device 120 determines whether to provide information about the candidate resources.

At block 530, in response to a determination that the information is to be provided, the second terminal device 120 transmits the information to the first terminal device 110.

In some embodiments, determining whether to provide the information about the candidate resources comprises: in response to receiving a second request from the first terminal device 110, determining to provide the information, the second request indicating that the first terminal device 110 is to receive the information from the second terminal device 120.

In some embodiments, determining whether to provide the information about the candidate resources further comprises: determining whether to provide the information based on capability of the second terminal device 120.

In some embodiments, determining whether to provide the information about the candidate resources further comprises: determining whether to provide the information based on a distance between the second terminal device 120 and the first terminal device 110.

In some embodiments, the distance comprises one of a physical distance and a radio distance.

In some embodiments, receiving the second request comprises receiving the second request via one of the following: SCI, an MAC CE, or an RRC signaling.

In some embodiments, receiving the second request via the SCI comprises receiving the second request via one of the following: a first stage SCI carried on a PSCCH, or a second stage SCI carried on a PSSCH.

In some embodiments, the method 500 further comprises: transmitting a first response to the second request to the first terminal device 110, the first response indicating that the second terminal device 120 accepts the second request.

In some embodiments, transmitting the first response comprises: transmitting the first response via a PSFCH.

In some embodiments, transmitting the information comprises: transmitting to the first terminal device 110 an indication indicating a location of the information.

In some embodiments, the indication indicates the location of the information in an MAC CE on a PSSCH.

In some embodiments, the method 500 further comprises: transmitting a second response to the second request to the first terminal device 110, the second response indicating that the second terminal device 120 rejects the second request.

In some embodiments, transmitting the second response comprises: transmitting the second response via a PSFCH.

In some embodiments, determining whether to provide the information about the candidate resources comprises: in response to time elapsed between two successive successful receptions of two different packets transmitted from the first terminal device 110 to the second terminal device 120 for a single application exceeding a configured threshold, determining to provide the information.

In some embodiments, determining whether to provide the information about the candidate resources comprises: in response to receiving from a network device a signaling indicating that the first terminal device 110 is to receive the information from the second terminal device 120, determining to provide the information.

In some embodiments, the method 500 further comprises: transmitting a first request to the first terminal device 110, the first request indicating that the second terminal device 120 is to transmit the information to the first terminal device 110.

In some embodiments, the candidate resources comprise a first set of slots that will not be used by the second terminal device 120.

In some embodiments, the candidate resources comprise a second set of slots that will be used by the second terminal device 120.

In some embodiments, the candidate resources comprise one or more sets of resources which are results of sensing for sidelink channels at least by the second terminal device 120.

In some embodiments, transmitting the information comprises transmitting the information via one of the following: a PSFCH, a PSSCH, or an RRC signaling.

Figure 6:
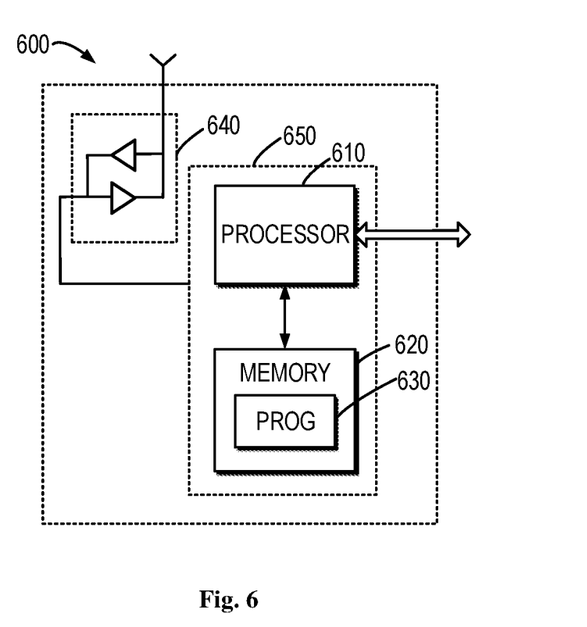
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the terminal device 110 or 120 as shown in FIG. 1. Accordingly, the device 600 can be implemented at or as at least a part of the terminal device 110 or 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 1 to 6. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote readable media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal comprising:
a memory; and
a processor configured to:
   receive, from a second terminal, via a Physical Sidelink Feedback Channel (PSFCH), information about a slot in which the second terminal does not expect to perform reception on a sidelink due to half-duplex operation,
     wherein the first terminal is an intended receiver of the second terminal for a resource of a Physical Sidelink Shared Channel (PSSCH) transmission; and
   determine a target resource of a transmission of the sidelink from the first terminal to the second terminal by excluding the slot.

2. A second terminal comprising:
a memory; and
a processor configured to:
   transmit, to a first terminal, via a Physical Sidelink Feedback Channel (PSFCH), information about a slot in which the second terminal does not expect to perform reception on a sidelink due to half-duplex operation,
     wherein the first terminal is an intended receiver of the second terminal for a resource of a Physical Sidelink Shared Channel (PSSCH) transmission; and
   receive a transmission of the sidelink from the first terminal to the second terminal using a target resource determined by excluding the slot.

3. A method comprising:
receiving, from a second terminal, via a Physical Sidelink Feedback Channel (PSFCH), information about a slot in which the second terminal does not expect to perform reception on a sidelink due to half-duplex operation,
   wherein the first terminal is an intended receiver of the second terminal for a resource of a Physical Sidelink Shared Channel (PSSCH) transmission; and
determine a target resource of a transmission of the sidelink from a first terminal to the second terminal by excluding the slot.

4. A method comprising:
transmitting, to a first terminal, via a Physical Sidelink Feedback Channel (PSFCH), information about a slot in which a second terminal does not expect to perform reception on a sidelink due to half-duplex operation, wherein the first terminal is an intended receiver of the second terminal for a resource of a Physical Sidelink Shared Channel (PSSCH) transmission; and receiving a transmission of the sidelink from the first terminal to the second terminal using a target resource determined by excluding the slot.

* * * * *